United States Patent [19]

Perkins et al.

[11] Patent Number: 5,828,414
[45] Date of Patent: Oct. 27, 1998

[54] REDUCTION OF TIMING JITTER IN AUDIO-VIDEO TRANSPORT STREAMS

[75] Inventors: Michael G. Perkins, Louisville, Colo.; Thomas Lookabaugh, Sunnyvale, Calif.

[73] Assignee: Divicom, Inc., Milpitas, Calif.

[21] Appl. No.: 606,197

[22] Filed: Feb. 23, 1996

[51] Int. Cl.$^6$ ........................................ H04N 7/12
[52] U.S. Cl. ........................ 348/423; 348/845.3
[58] Field of Search ................. 348/845.3, 423, 348/515, 500, 192, 464; 375/316; H04N 7/12

[56] References Cited

U.S. PATENT DOCUMENTS

| | | | |
|---|---|---|---|
| 5,381,181 | 1/1995 | Deiss | 348/423 |
| 5,396,497 | 3/1995 | Veltman | 348/423 |
| 5,430,485 | 7/1995 | Lankford et al. | 348/423 |
| 5,467,137 | 11/1995 | Zdepski | 348/845.3 |
| 5,467,139 | 11/1995 | Lankford | 348/423 |
| 5,473,385 | 12/1995 | Leske | 348/845.3 |
| 5,588,025 | 12/1996 | Strolle et al. | 375/316 |
| 5,598,352 | 1/1997 | Rosenau et al. | 348/423 |
| 5,652,749 | 7/1997 | Davenport et al. | 348/464 |
| 5,654,751 | 8/1997 | Richard, III | 348/192 |

*Primary Examiner*—Tommy P. Chin
*Assistant Examiner*—Y. Lee
*Attorney, Agent, or Firm*—Meltzer, Lippe, Goldstein, Wolf & Schlissel, P.C.

[57] ABSTRACT

A method and apparatus for reducing program clock reference (PCR) jitter in transport packets of a transport stream compliant with MPEG-2 or another suitable audio-video encoding standard. The PCRs from a given single program transport stream (SPTS) of a multi-program transport stream are processed in a phase-locked loop (PLL) to generate dejittered PCRs for that SPTS. The PLL for a given SPTS receives as inputs the PCRs from that SPTS and a cycle count for each PCR indicative of the number of asynchronous clock cycles counted since the previous PCR. The PLL generates a given dejittered PCR as a function of the previous dejittered PCR, the cycle count for the given PCR, and a clock frequency mismatch estimate for the given program clock. The clock frequency mismatch estimate is generated by filtering a sequence of jitter estimates, each corresponding to the difference between a previous PCR and its corresponding dejittered PCR. The SPTS transport packets may then be restamped with the dejittered PCRs from the PLL to provide a dejittered multi-program transport stream.

13 Claims, 4 Drawing Sheets

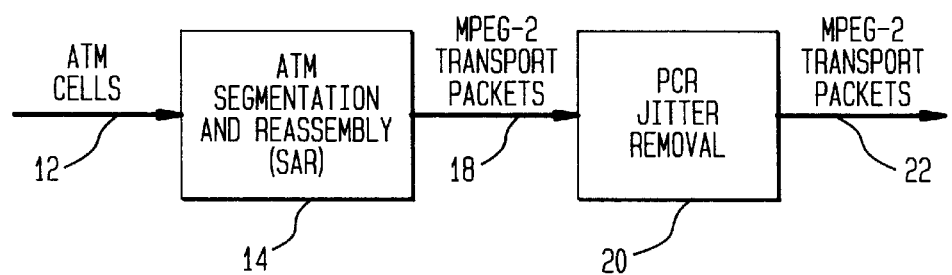
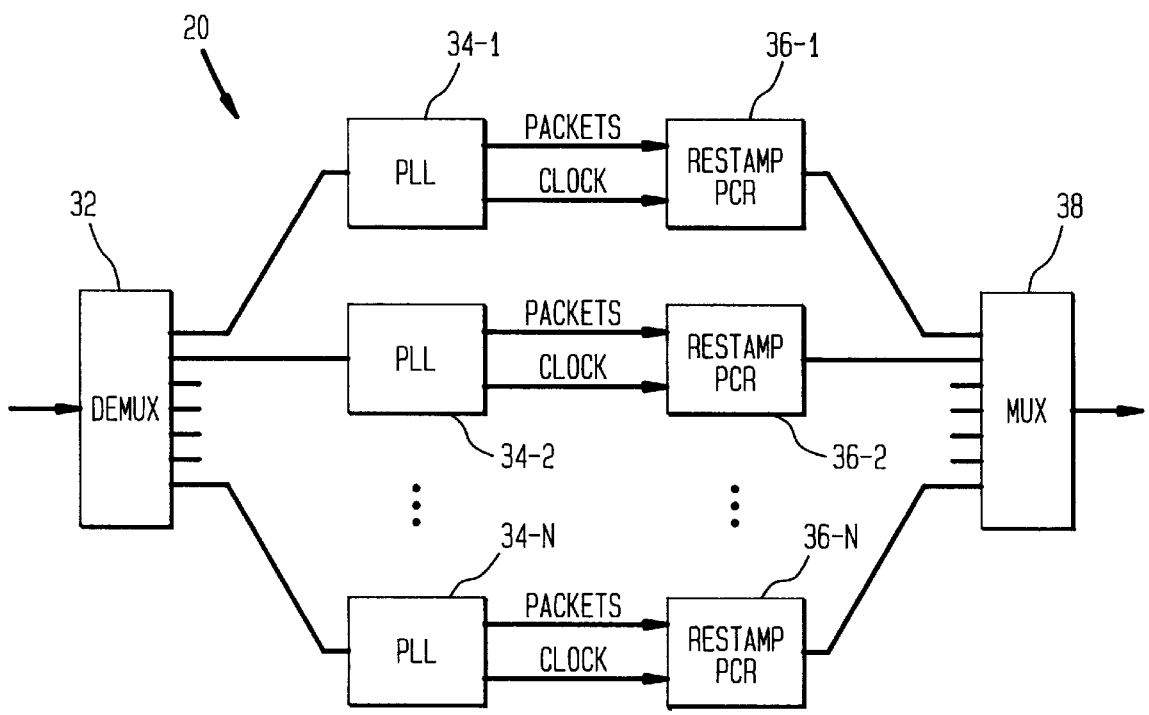

REDUCTION OF TIMING JITTER IN AUDIO-VIDEO TRANSPORT STREAMS

FIELD OF THE INVENTION

The present invention relates to the reduction of timing jitter in hierarchically organized audio-video signals. More particularly, the present invention relates to reducing jitter in program clock references (PCRs) of transport packets in a transport stream which includes multiplexed audio and/or video data streams from a number of different programs.

BACKGROUND OF THE INVENTION

Many digital multimedia applications require efficient compression and transmission of video and audio information. MPEG-2 is a well-known international standard for compression and transmission of video and audio data streams. The MPEG-2 standard was developed by the International Standards Organization (ISO) Moving Picture Experts Group (MPEG) and is documented in ISO/IEC DIS 13818-1, "Information Technology-Generic Coding of Moving Pictures and Associated Audio Information: Systems," ISO/IEC DIS 13818-2, "Information Technology-Generic Coding of Moving Pictures and Associated Audio Information: Video" and ISO/IEC Committee Draft 13818-3, "Information Technology-Generic Coding of Moving Pictures and Associated Audio Information: Audio." The above-cited ISO documents are incorporated herein by reference. The MPEG-2 systems specification provides a multi-layer hierarchical organization for multiplexing and transmission of video, audio and other types of program data streams, and is described in greater detail in A. Wasilewski, "MPEG-2 Systems Specification: Blueprint for Network Interoperability," Communications Technology, February 1994, which is incorporated by reference herein. The MPEG-2 video and audio specifications provide compression and encoding of video and audio data streams. MPEG-2 video compression is described in greater detail in D. LeGall, "MPEG: A Video Compression Standard for Multimedia Applications," Communications of the ACM, Vol. 34, No. 4, pp. 46–58, April 1991, which is incorporated by reference herein.

The systems aspects of the MPEG-2 standard generally involve multiplexing several elementary streams from one or more programs to form a higher level packet-based stream. A given program may correspond to one or more television or motion picture signals and may include multiple elementary streams in the form of separately-encoded compressed video and audio data streams, as well as other program data streams such as closed caption text. The higher level packet-based stream in accordance with the MPEG-2 standard may be either a program stream or a transport stream. An MPEG-2 program stream generally carries a single program such that all elementary streams in the program stream share a common time base, while an MPEG-2 transport stream can carry elementary streams from multiple programs with different time bases. An MPEG-2 program stream generally uses variable-length packets and is intended for use in transmission applications with relatively low error rates. An MPEG-2 transport stream generally uses fixed length packets and includes error reduction and detection features.

The program and transport streams associate related elementary data streams for a given program or programs such that the elementary streams can be extracted, decoded and presented together in a coherent fashion. The program and transport streams may be recorded on or played back from a digital video disc (DVD), video tape, magnetic or optical disk drive or other suitable storage device. It should be noted that both program streams and transport streams may be considered part of a transport layer in accordance with the ISO network reference model as set forth in the ISO 7498 standard. The term "transport stream" as used herein is therefore intended to include both MPEG-2 program streams and transport streams as well as other packet-based data streams formed in accordance with standards other than MPEG-2.

FIG. 1A shows an exemplary packetized elementary stream (PES) packet in accordance with the MPEG-2 standard. The PES packet has a variable length which may be as long as about 64 kbytes and includes a PES header and a quantity of elementary stream data. As noted above, the elementary stream data may correspond to an audio stream, a video stream or another type of data stream. The PES packet structure separates the relatively long elementary streams into more manageable units, and permits the attachment of timing, identification and control information to particular portions of an elementary stream. Each PES packet is typically separated into a plurality of fixed-length 188-byte transport packets.

FIG. 1B shows an exemplary MPEG-2 transport packet. The packet includes a one-byte sync pattern, a three-byte prefix and a payload which may include a portion of the PES packet information shown in FIG. 1A. The exemplary transport packet shown also includes a variable-length adaptation field. The adaptation field may include, for example, program clock reference (PCR) and encryption key management information. The sync byte is a fixed pattern which permits identification of the beginning of each transport packet, and is 47H in the MPEG-2 standard. The prefix includes a thirteen-bit packet identifier (PID) which identifies the elementary stream carried by the corresponding transport packet. All PES-bearing transport packets with a given PID carry elementary stream data for only a single elementary stream and no other. The transport packet prefix also includes two adaptation field control bits which indicate whether the corresponding transport packet includes a payload with no adaptation field, an adaptation field with no payload, or both an adaptation field and a payload as shown in FIG. 1B. The prefix further includes a packet error indicator bit, a payload unit start indicator bit, a transport priority bit, two transport scrambling control bits and a four-bit continuity counter. The payload portion of the transport packet will include elementary stream data from a corresponding PES packet if the transport packet is of the PES-bearing type. The transport packet may also be of the program specific information (PSI) type or the private data type. A PSI-bearing transport packet does not include any portion of a PES packet and therefore does not include elementary stream data. Instead, the PSI-bearing packet includes information for correlating the various elementary streams associated with a given program, for identifying transport packets containing PCR information pertinent to a given program or elementary stream, and for performing other program specific functions.

FIG. 1C shows the format of the PCR information which may be included in the adaptation field of a transport packet. The PCR bits represent the value of the system time clock (STC) for a given program at the time when the PCR bits were inserted into the transport stream. Each program may have a different STC and therefore transport packets carrying elementary streams from different programs will generally have asynchronous PCRs. The STC for a given program is also referred to herein as a program clock. The PCR bits include thirty-three bits of PCR-BASE and nine bits of PCR-EXT. The PCR-EXT is a modulo-300 counter incremented at a clock rate of 27 MHz. The PCR-BASE is incremented after every 300 increments of the 27 MHz clock and thus represents a thirty-three bit counter operating at about 90 kHz. The PCR information is inserted into a transport packet during an encoding operation and is utilized in transport packet decoding to initialize and maintain the decoder system clock. Synchronization of audio, video and data streams within a given program is provided using the PCR information as well as presentation time stamps (PTSs) and decode time stamps (DTSs) which may be placed in the PES packet header.

A significant problem which can arise in transmission of MPEG-2 transport packets is PCR timing jitter. The timing jitter may be the result of transmission of the transport packets over a jitter-inducing network such as an asynchronous transfer mode (ATM) network. Another typical cause of PCR timing jitter is multiplexing MPEG-2 transport streams without restamping the PCRs. The jitter may result in underflow or overflow conditions in a decoder buffer and can make it difficult for the decoder to accurately recover the program time base. It will therefore be desirable in many applications to reduce the PCR jitter in a given transport stream.

FIG. 2 illustrates jitter reduction for MPEG-2 transport packets transmitted over an ATM network. The MPEG-2 transport packets in this example are arranged in ATM adaptation layer type 5 (AAL-5) protocol data units (PDUs). The PDUs are in turn carried by conventional 53-byte ATM cells. The ATM cells are received via an ATM network transmission line 12 in an ATM segmentation and reassembly (SAR) layer 14. The SAR layer 14 converts the ATM cells to AAL type 5 PDUs and recovers the MPEG-2 transport packets therefrom using known techniques. The MPEG-2 transport packets on line 18 exhibit excessive PCR jitter due to the asynchronous characteristics of the ATM network over which the packets have been transmitted. The packets are therefore applied to a PCR jitter removal device 20 which provides at its output on line 22 a corresponding stream of transport packets with substantially reduced PCR jitter.

FIG. 3 shows an exemplary PCR jitter removal device 20 in accordance with the prior art. The device 20 includes an input demultiplexer 32 which separates the MPEG-2 transport packet stream into N single program transport streams (SPTSs) each carrying elementary streams from the same program and therefore having PCRs derived from the same program clock. Each SPTS is applied to a separate phase-locked loop (PLL) 34-j, j =1, 2, . . . N which generates a recovered program clock from substream i by locking to the jittered PCRs in that SPTS. The packets of SPTS j are then supplied along with the recovered program clock for SPTS j to a PCR restamp device 36-j, j =1, 2, . . . N. The restamp device 36-j for a given SPTS j adjusts the PCRs for the transport packets in SPTS j to correspond to the recovered program clock for that SPTS. The restamped transport packets from the N SPTSs are then recombined in multiplexer 38 to provide an output multi-program transport stream having reduced PCR jitter. It should be noted that the multiplexer 38 may also perform a PCR restamping operation in order to account for the variable delay experienced by PCR-bearing packets in passing through the multiplexer.

FIG. 4 shows another exemplary PCR jitter removal device 20 in accordance with the prior art. The device 20 includes an input demultiplexer 32 and output multiplexer 38 which function in the manner previously described. Each of N separate SPTSs from demultiplexer 32 is applied to a buffer 54-j of predetermined capacity. A corresponding PLL 56-j receives as an input a measure of buffer fullness from the buffer 54-j. The PLL 56-j locks to the fullness measure and provides an output signal to an output control device 58-j which provides the transport packets in the corresponding SPTS to the multiplexer 38 at a uniform rate such that jitter is removed. The output of the multiplexer 38 is therefore at a rate corresponding to the original transport stream rate.

The above-described prior art approaches to jitter removal suffer from a number of drawbacks. For example, a separate PLL is generally required for each of the N separate SPTS channels in the jitter removal device. Each PLL generally includes a different voltage-controlled crystal oscillator (VCXO) tuned to the program clock from which the PCRs for the corresponding SPTS are derived. This unduly increases the cost and complexity of the jitter removal device.

As is apparent from the above, there is a need for an improved technique for transport stream PCR jitter reduction which avoids the excessive cost and complexity as well as other problems of the prior art.

SUMMARY OF THE INVENTION

The present invention provides methods and apparatus for removing or otherwise reducing program clock reference (PCR) jitter in a transport stream. The jitter reduction of the present invention may be implemented using a single asynchronous clock source. The clock cycles of the source are processed in a digital signal processor (DSP) or similar device to provide separate software phase-locked loops (PLLs) for each single program transport stream (SPTS) of a multi-program transport stream. As used herein, the term "multi-program transport stream" includes a number of SPTSs multiplexed together or otherwise combined. The present invention eliminates the need for a separate voltage controlled crystal oscillator (VCXO) or other clock source in each SPTS channel of a jitter removal device. The invention is particularly well-suited for use with MPEG-2 compliant transport streams.

In accordance with one aspect of the invention, a method of reducing PCR jitter is provided which includes the steps of processing transport packet PCRs of one or more SPTSs of a multi-program transport stream to generate corresponding dejittered PCRs as a function of clock frequency mismatch between program clocks of the one or more SPTSs and an asynchronous clock; and restamping the transport packets of the one or more SPTSs with the corresponding dejittered PCRs. The asynchronous clock is generally set to a frequency of 27 MHz in MPEG-2 applications so as to correspond to an MPEG-2 program clock. A program clock as the term is used herein refers generally to the clock referenced by a given PCR, and in the context of MPEG-2 is generally the system time clock (STC) or a representation thereof for the SPTS which includes the given PCR.

The step of processing the PCRs to generate dejittered PCRs for a given SPTS may be implemented in software as a PLL and may include the following operations. A cycle count for a current PCR is generated by determining the number of cycles of the asynchronous clock between a previous PCR and the current PCR. A current estimate of the clock frequency mismatch between an SPTS program clock and the asynchronous clock is generated as a function of a sequence of jitter estimates for previous PCRs, where a given jitter estimate is computed as the difference between a PCR and its corresponding dejittered PCR. A dejittered PCR is then generated for the current PCR as the sum of (i) a previous dejittered PCR, (ii) the current cycle count, and (iii) a product of the current cycle count and the current clock frequency mismatch estimate divided by the nominal frequency of the asynchronous clock. The current clock frequency mismatch estimate may be generated by filtering the sequence of jitter estimates for the previous PCRs in an infinite impulse response (IIR) filter within the PLL.

In accordance with another aspect of the invention, an apparatus is provided which includes a counter which counts asynchronous clock cycles between receipt of PCRs for transport packets in a given SPTS of a multi-program transport stream. The counter supplies the cycle counts as an input to a processor which generates dejittered PCRs as a function of the received PCRs and the cycle counts. The processor may include for each SPTS a PLL which generates an additive correction term to compensate for the clock frequency mismatch between the program clock of the SPTS and the asynchronous clock. The PLL receives a current cycle count for a current PCR and generates a current clock frequency mismatch estimate indicative of mismatch between the program clock and the asynchronous clock. The current mismatch estimate is a function of a sequence of jitter estimates for previous PCRs. The PLL generates a dejittered PCR for the current PCR as a function of a previous dejittered PCR, the current cycle count, and the current clock frequency mismatch estimate.

BRIEF DESCRIPTION OF THE DRAWINGS

FIG. 2 is a block diagram illustrating conventional program clock reference (PCR) jitter removal for an MPEG-2 transport stream transmitted over an asynchronous transfer mode (ATM) network.

FIGS. 3 and 4 are block diagrams of exemplary PCR jitter removal devices in accordance with the prior art.

DETAILED DESCRIPTION OF THE INVENTION

Although the present invention will be illustrated below primarily in conjunction with MPEG-2 transport streams, the invention is more broadly applicable to MPEG-2 program streams as well as to packet-based data streams generated in accordance with standards other than MPEG-2. These other standards include frame relay and transmission control protocol/Internet protocol (TCP/IP). It should also be recognized that the invention is well-suited for use in a variety of applications other than removal of network-induced jitter. The term "transport stream" as used herein should be understood to include both MPEG-2 transport and program streams as well as any packet-based digital data stream which includes video, audio or other types of data, or various combinations thereof. The term "transport packet" refers to a packet within a transport stream. The term "multi-program transport stream" as used herein is intended to include a number of single program transport streams (SPTSs) multiplexed together or otherwise combined, as well as a transport stream which simply contains data from multiple programs. The description of the illustrative embodiments of the invention will thus refer to a given SPTS within a multi-program stream. The term "program clock reference" is intended to include any clock reference or other timing information contained within or otherwise associated with a given transport packet. The term "program clock" refers to a system time clock (STC) or other timing information source, or a recovered representation thereof, which is characterized by the PCRs of a given program within a transport stream.

Figure 5:
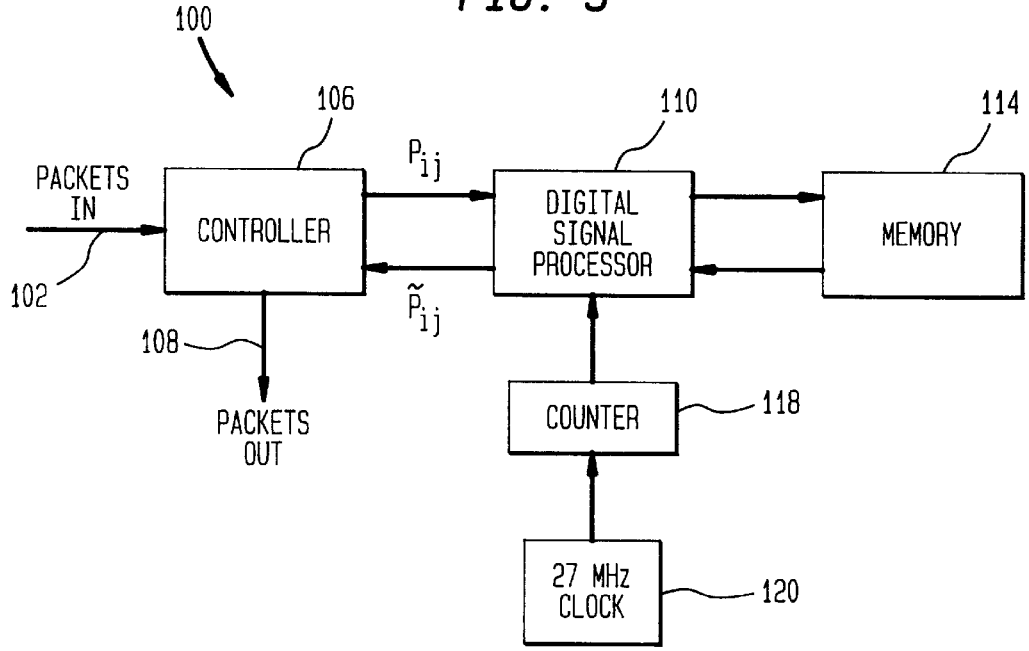
FIG. 5 is a block diagram of an exemplary PCR jitter removal device in accordance with the present invention.

FIG. 5 shows an exemplary jitter removal device 100 in accordance with one possible embodiment of the present invention. The jitter removal device 100 includes a controller 106, a digital signal processor 110 and a memory 114. The controller 106 receives a multi-program transport packet stream on input line 102 and provides a dejittered multi-program transport packet stream on output line 108. The transport packets on line 102 may be received from any suitable transport packet source. For example, the received transport packets may have been generated from audio and video signal components of an analog audio-video signal, such as an NTSC, PAL or HDTV signal, in the following manner. The video signal component is first converted to a digital format which includes a luminance signal and two chrominance signals. The digital video signal and any audio component are then encoded. The encoded video and audio bit streams representing elementary streams of one or more programs are multiplexed to provide the transport packet stream. The transport stream is converted to an ATM adaptation layer type 5 (AAL-5) protocol data unit (PDU) format or other suitable format for transmission over a network. The input line 102 may thus represent the output of the SAR layer of an ATM network as was described in conjunction with FIG. 2 above or the transport packet output of any other jitter-inducing network or device.

The controller 106 supplies program clock references (PCRs) $P_{ij}$ associated with the ith transport packet in the jth SPTS to the digital signal processor 110. The processor 110 uses the PCRs to compute PCR estimates $\hat{P}_{ij}$ for the transport packets of each single program transport stream (SPTS) of the input multi-program transport stream in a manner to be described in greater detail below. The PCR estimates are supplied back to the controller 106 which uses the estimates to restamp the PCRs for the transport packets in the SPTSs. The processor accesses memory 114 to store and retrieve PCR values, PCR estimates, and/or counter values as required. The digital signal processor 110 generates the PCR estimates using an input signal from a counter 118 driven by a 27 MHz asynchronous clock 120. The 27 MHz clock 120 is asynchronous in that it is generally not synchronized to any of the system time clocks (STCs) used to provide the PCRs of the input transport stream packets. The STCs are more generally referred to herein as program clocks.

The counter 118 may be a resetable counter which is reset after receipt of each PCR in a given SPTS, in which case a separate resetable counter will generally be required for each SPTS. Alternatively, counter 118 may be implemented as a counter which is either non-resetable or simply not reset during normal operation and in such an embodiment time differences can be measured by subtracting the counter values received at different times. A single counter 118 could then be used for all of the SPTSs. For example, the digital signal processor 110 could store a counter value every time it receives a new PCR of a given SPTS, and then compute the time difference between consecutive PCRs in the SPTS by subtracting counter values. The clock frequency of the asynchronous clock 120 is selected as 27 MHz in this embodiment because the program clock frequency in accordance with the MPEG-2 specification is 27 MHz. Alternative clock frequencies could be used in other MPEG and non-MPEG embodiments.

Figure 1A:
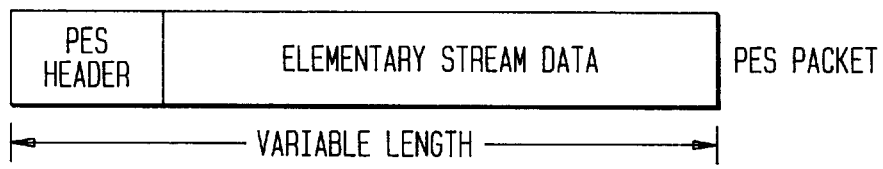
FIGS. 1A–1C show data formats in accordance with the MPEG-2 standard.
Figure 1B:
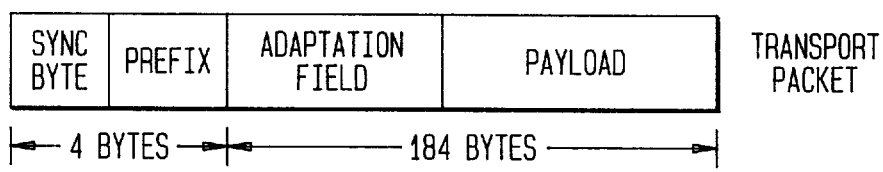
Figure 1C:
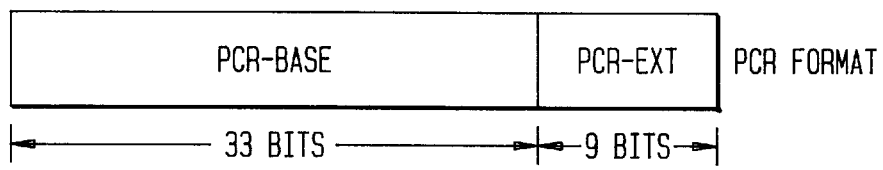
Figure 4:
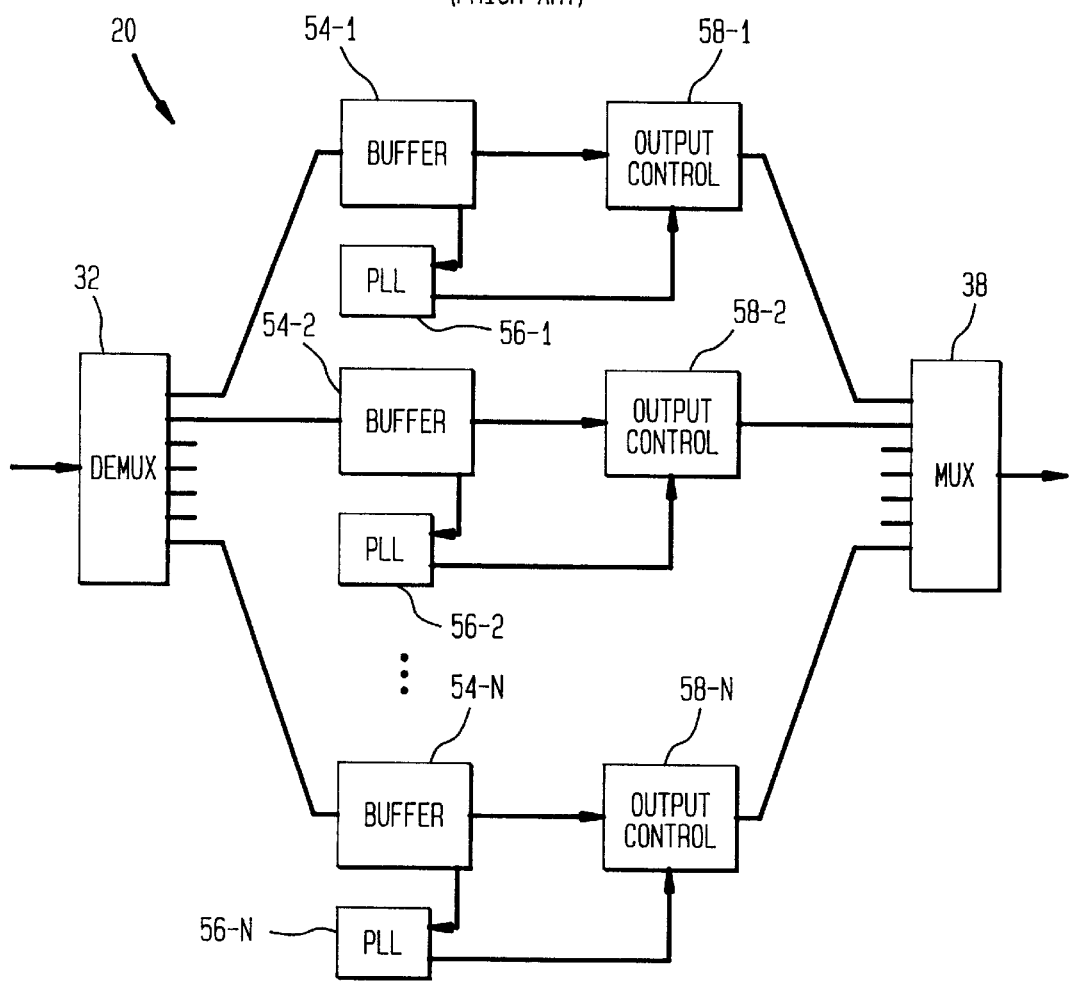
Figure 6:
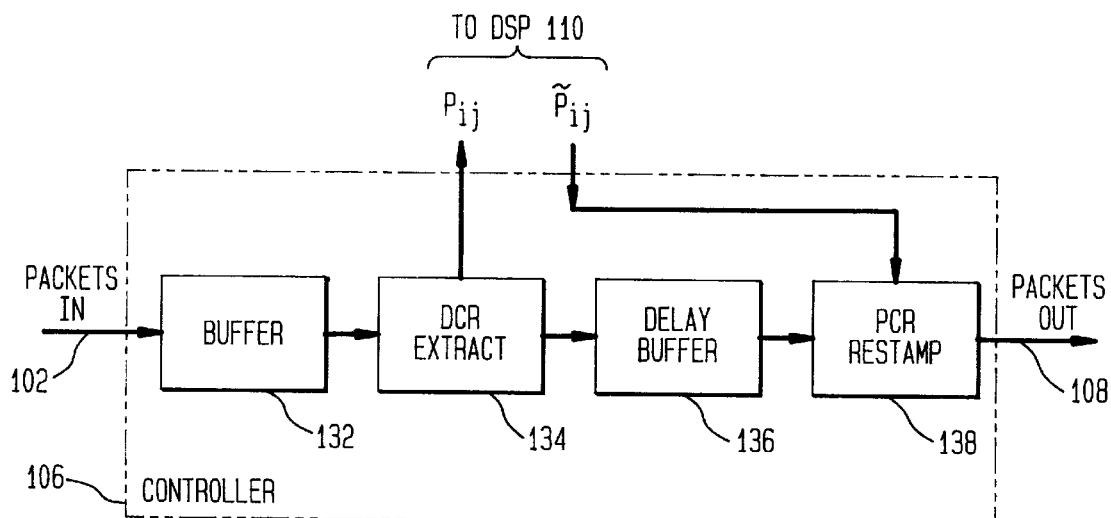
FIG. 6 is a block diagram of an exemplary controller suitable for use in the PCR jitter removal device of FIG. 5.

FIG. 6 shows a more detailed block diagram of the controller 106. The controller 106 includes an input buffer 132 which receives a stream of transport packets having PCR jitter via input line 102. A PCR extract device 134 identifies input transport packets with PCRs and determines the SPTSs to which the packets belong. The PCR extract device 134 provides the PCR $P_{ij}$ associated with the ith transport packet in the jth SPTS to the digital signal processor 110. The corresponding transport packet is supplied to a delay buffer 136. The digital signal processor 110 processes the PCRs $P_{ij}$ to generate the PCR estimates $\tilde{P}_{ij}$ which are supplied as inputs to a PCR restamp device 138 in controller 106. The restamp device 138 restamps the original PCRs of the transport packets received from delay buffer 136 with the corresponding PCR estimates $\tilde{P}_{ij}$. Alternative controllers suitable for use with the present invention may be configured to include demultiplexing, buffering, restamping, output control and/or multiplexing elements as in the PCR jitter removal devices of FIGS. 3 and 4. The PLL elements of FIGS. 3 and 4 could be implemented in software in the digital signal processor 110.

The computation of PCR estimates $\tilde{P}_{ij}$ in the digital signal processor 110 will now be described in greater detail. A similar estimate computation is utilized for each of the SPTSs and therefore the computation will be described for an exemplary SPTS. The designation $P_i$ will refer to the ith PCR in the exemplary SPTS. This PCR will be restamped with the dejittered PCR estimate $\tilde{P}_i$ in the controller 106. The estimate computation process may be initialized by letting $\tilde{P}_0 = P_0$ such that the first PCR value in the SPTS will remain unchanged. It is assumed that the 27 MHz clock 120 is asynchronous and thus not locked to any of the program clocks used to generate the PCRs. The MPEG-2 standard specifies that the uncertainty in program clock frequency will be ±30 ppm for compliant transport streams. The asynchronous clock 120 can be easily provided with an uncertainty on the order of ±5 ppm such that the SPTS program clocks and the asynchronous clock 120 will be close in frequency even though they are asynchronous.

The clock signal from asynchronous clock 120 is used to increment counter 118. The counter 118 may be reset to zero whenever a PCR $P_i$ is received from the controller 106. As noted above, the counter 118 need not be reset and in an embodiment in which the counter is not reset the digital signal processor 110 can compute time differences between PCRs by subtracting counter values. The estimate $\tilde{P}_1$ is computed when the PCR $P_1$ is received from the controller 106 in accordance with the equation:

$$\tilde{P}_1 = \tilde{P}_0 + C_1$$

where cycle count $C_1$ is the value of the counter 118 when PCR $P_1$ is received in the digital signal processor 110, assuming counter 119 was reset upon receipt of the previous PCR $P_0$. Alternatively, cycle count $C_1$ may be the result of a subtraction operation performed on the counter values at the receipt of PCRs $P_0$ and $P_1$. If the asynchronous clock 120 were locked to the program clock corresponding to PCR $P_1$, the estimate $\tilde{P}_1$ would exactly correct the value of PCR $P_1$. However, because the program clock and asynchronous clock 120 are not locked, the following adjustment process is used to account for the difference.

A jitter estimate $\epsilon_i$ is defined for $i \geq 1$ as follows:

$$\epsilon_i = P_i - \tilde{P}_i$$

The sequence $\{\epsilon_i\}$ is an estimate of the total jitter experienced by the ith PCR $P_i$. The present invention determines an additive correction term to compensate for the mismatch between clock 120 and the given SPTS program clock by filtering the $\{\epsilon_i\}$ to remove the jitter components. As will be described in conjunction with FIG. 7 below, this filtering operation may be performed using a phase-locked loop (PLL).

In the general case the ith PCR for the exemplary SPTS will be estimated as follows for values of $i \geq 2$:

$$\tilde{P}_i = \tilde{P}_{i-1} + C_i + \frac{C_i}{27 \times 10^6} f_i$$

where $f_i$ is the ith estimate of the clock mismatch between clock 120 and the program clock for the exemplary SPTS, and $C_i$ is a cycle count corresponding to the number of asynchronous clock cycles counted between receipt of the PCRs $P_i$ and $P_{i-1}$. The value of $f_i$ is given by:

$$f_i = f(\{\epsilon_n\})$$

for n=1 to i−1 and in which the function f(.) is implemented as part of a PLL function or other suitable feedback control system function.

Figure 7:
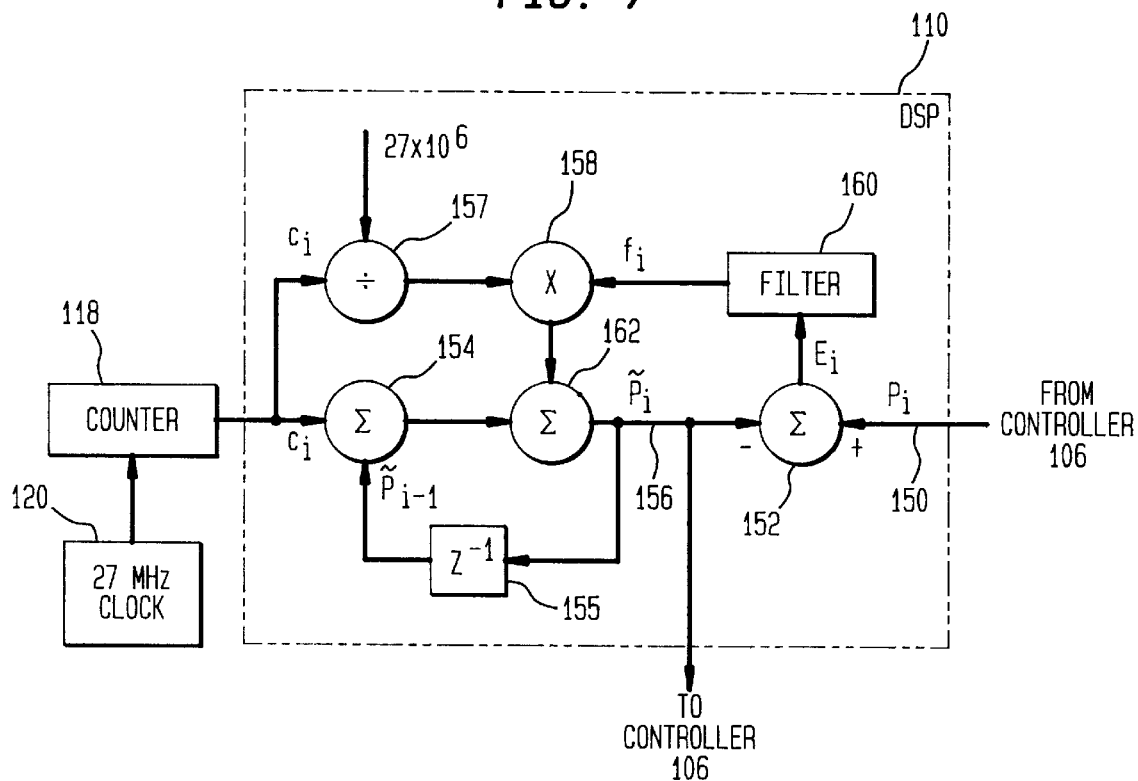
FIG. 7 is a schematic diagram illustrating the operation of a portion of an exemplary digital signal processor suitable for use in the PCR jitter removal device of FIG. 5.

FIG. 7 is a schematic diagram of a portion of the digital signal processor 110 which performs the above-described PCR estimation process. The PCR $P_i$ is received via line 150 from controller 106 and applied to a signal combiner 152. The corresponding cycle count $C_i$ from counter 118 is supplied to a signal combiner 154 in which it is combined with the PCR estimate $\tilde{P}_{i-1}$ for the previous transport packet in the SPTS. It should be noted that the cycle count $C_i$ may alternatively be supplied from a suitable processor, circuit or device which generates $C_i$ by subtracting counter values as previously described. The previous PCR estimate $\tilde{P}_{i-1}$ is supplied from output line 156 to the signal combiner 154 via a delay element 155. The cycle count $C_i$ is also applied to a signal divider 157 in which it is divided by the constant $27 \times 10^6$. Use of alternative asynchronous clock frequencies will generally necessitate a corresponding change in this constant. The result is applied to a signal multiplier 158 in which it is multiplied with the ith frequency mismatch estimate $f_i$ as supplied from a filter 160.

The filter 160 in this embodiment is an infinite impulse response (IIR) filter which receives and filters the jitter estimate $\epsilon_i$ for the ith PCR $P_i$ to provide the frequency mismatch estimate $f_i$ in accordance with the above equations. The filter 160 may be implemented within digital signal processor 110 using the following program:

```
filter (epsilon, C, param)
{
    x = epsilon
    alpha = 1/pow(2.0, param + 6) - 1;
    beta = 1/pow(2.0, param + 3) - 1;
    loopconstant = 27,000,000/(100*C*pow(2.0, 2*(param + 1)));
```

```
-continued
y = x + alpha*xm1 + beta*(ym2 - ym1) + ym1;
ym2 = ym1;
ym1 = y;
xm1 = x;

return (loopconstant*y);
}
``` in which epsilon refers to $\epsilon_i$, C refers to the number of elapsed asynchronous clock cycles between consecutive PCRs of the same SPTS, the function pow(a,b) refers to $a^b$, and the variable param is a parameter that controls the loop bandwidth of the PLL. Large values of param generally result in better jitter rejection, but at the cost of longer acquisition times. Values for param in the range from about 1 to 6 may be suitable in a given application. For example, a value of 6 is suitable in applications in which a high degree of jitter rejection is desired. Alternatives to the IIR filter described above include a wide variety of different types of IIR filters as well as non IIR filters. In general, the filter 160 could be any filter providing the desired isolation of jitter components with a loop bandwidth and acquisition time acceptable for a given application. The PLL parameters could be adjusted as a function of the transport stream bit rate. For example, a faster loop acquisition time could be used for those SPTSs which are known to have a higher bit rate.

A separate PLL as shown in FIG. 7 will generally be used for each of the SPTSs in the input transport stream. However, each of the PLLs can utilize the same asynchronous clock 120 rather than a separate VCXO tuned to the SPTS program clock as in prior art jitter removal. The present invention uses a single VCXO or other stable clock source for all SPTSs and thus results in an inexpensive and efficient implementation. As noted above, the present invention may be implemented in the configuration of FIG. 3 or FIG. 4 by altering the PLLs for each SPTS channel to operate with a common asynchronous clock in the manner previously described.

The present invention is suitable for use in any application in which transport stream jitter removal is desirable. For example, assume a given MPEG-2 transport stream processing device such as a television set-top box can accept a peak-to-peak jitter of no more than 200 μsec. This implies that the peak-to-peak loop error may vary by no more than 5400 27 MHz clock cycles after the loop reaches steady state. A jitter removal device in accordance with the present invention could be installed within the set-top box, or in a device such as an ATM to MPEG-2 converter located in the transport stream signal path before the set-top box. Simulations indicate that selecting a param value of 3 in the above-described PLL will generally meet the peak-to-peak jitter requirements of such a set-top box for bit rates of 1 Mbps or higher. A steady state can be achieved after about 1500 PCRs, resulting in an acquisition time of about 75 seconds if PCRs are inserted into the corresponding SPTS at a rate of about 20 per second.

Simulations on the above-described embodiments of the invention indicate that for a total network jitter of 2 msec peak-to-peak, the output steady-state peak-to-peak jitter can be reduced below a threshold amount which may be on the order of 50 μsec in certain applications. The resulting recovered clock in an MPEG-2 decoder will generally have a very stable long-term average frequency with a deviation on the order of ±2 ppm. This recovered clock should be more than adequate to suppress chroma artifacts in most displays. It should also be noted that the decoder buffer should be able to accommodate variations in the peak-to-peak jitter prior to PLL acquisition. This may be ensured by multiplexing the SPTSs at the transport stream encoder such that the utilization of the encoder multiplex buffer is on the order of fifty percent. If an existing multiplex buffer constraint prevents such a utilization, the video and/or audio can be encoded using a slightly reduced buffer size. This will generally allow a sufficient increase in the size of the video or audio multiplex buffer to provide the desired multiplex buffer utilization.

It should be understood that the foregoing description is merely illustrative of the invention. Numerous alternative embodiments within the scope of the appended claims will be apparent to those of ordinary skill in the art.

The invention claimed is:

1. A method of reducing program clock reference jitter in transport packets in a multiple program transport stream, the method comprising the steps of:

processing program clock references for transport packets of one or more single program transport streams within the multiple program stream to generate corresponding dejittered program clock references as a function of clock frequency mismatch between a program clock and an asynchronous clock;

generating a current cycle count for a current program clock reference indicative of the number of cycles of the asynchronous clock between the current program clock reference and a previous program clock reference;

generating a current clock frequency mismatch estimate indicative of mismatch between a program clock and the asynchronous clock, wherein the mismatch estimate is a function of a sequence of jitter estimates for previous program clock references, and further wherein a given jitter estimate is the difference between a program clock reference and its corresponding dejittered program clock reference;

generating a dejittered program clock reference for the current program clock reference as a sum of (i) a previous dejittered program clock reference, (ii) the current cycle count, and (iii) a product of the current cycle count and the current clock frequency mismatch estimate; and restamping the transport packets of the single program stream or streams with the corresponding dejittered program clock references.

2. The method of claim 1 wherein the transport stream is an MPEG-2 compliant transport stream.

3. The method of claim 1 wherein the step of processing program clock references to generate corresponding dejittered program clock references further includes the steps of:

counting cycles of the asynchronous clock between a time a previous program clock reference is received and a time a current program clock reference is received to generate a current cycle count;

generating a current estimate of the clock frequency mismatch between a program clock and the asynchronous clock as a function of a sequence of jitter estimates for previous program clock references, wherein a given jitter estimate is the difference between a program clock reference and its corresponding dejittered program clock reference; and generating a dejittered program clock reference for the current program clock reference as a function of the current cycle count and the current clock frequency mismatch estimate.

4. The method of claim 1 wherein the step of processing program clock references to generate corresponding dejittered program clock references further includes the step of filtering a sequence of jitter estimates for previous program clock references, wherein a given jitter estimate is the difference between a program clock reference and its corresponding dejittered program clock reference.

5. The method of claim 1 wherein the step of processing program clock references to generate corresponding dejittered program clock references further includes the step of processing the program clock references in a phase-locked loop which generates an additive correction term to compensate for the mismatch between the program clock frequency and the asynchronous clock frequency.

6. A method of reducing program clock reference jitter in transport packets of a transport stream, the method comprising the steps of:

determining the number of cycles of an asynchronous clock between receipt of program clock references for transport packets in the transport stream;

generating dejittered program clock references as a function of the received program clock references and the number of asynchronous clock cycles;

generating a current cycle count for a current program clock reference indicative of the number of cycles of the asynchronous clock between the current program clock reference and a previous program clock reference;

generating a current clock frequency mismatch estimate indicative of mismatch between a program clock and the asynchronous clock, wherein the mismatch estimate is a function of a sequence of jitter estimates for previous program clock references, and further wherein a given jitter estimate is the difference between a program clock reference and its corresponding dejittered program clock reference; and generating a dejittered program clock reference for the current program clock reference as a sum of (i) a previous dejittered program clock reference, (ii) the current cycle count, and (iii) a product of the current cycle count and the current clock frequency mismatch estimate.

7. The method of claim 6 wherein the transport stream is an MPEG-2 compliant transport stream.

8. The method of claim 6 further including the steps of:

determining the number of cycles of the asynchronous clock between a time a previous program clock reference is received and a time a current program clock reference is received to generate a current cycle count;

generating a current estimate of the clock frequency mismatch between a program clock and the asynchronous clock as a function of a sequence of jitter estimates for previous program clock references, wherein a given jitter estimate is the difference between a program clock reference and its corresponding dejittered program clock reference; and generating a dejittered program clock reference for the current program clock reference as a function of the current cycle count and the current clock frequency mismatch estimate.

9. The method of claim 6 wherein the step of generating dejittered program clock references further includes the step of filtering a sequence of jitter estimates for previous program clock references, wherein a given jitter estimate is the difference between a program clock reference and its corresponding dejittered program clock reference.

10. The method of claim 6 wherein the step of generating dejittered program clock references further includes the step of processing the program clock references in a phase-locked loop which generates an additive correction term to compensate for the clock frequency mismatch.

11. An apparatus for reducing program clock reference jitter in transport packets of a transport stream, the apparatus comprising:

a counter having an input connected to the output of an asynchronous clock and an output corresponding to a count of cycles of the asynchronous clock;

a processor having a first input connected to the output of the counter and a second input connected to a source of program clock references of the transport stream, the processor having an output corresponding to dejittered program clock references generated in the processor as a function of the received program clock references and the asynchronous clock cycle count;

wherein the processor further includes a phase-locked loop which generates an additive correction term to compensate for clock frequency mismatch between a program clock and the asynchronous clock; further wherein the phase-locked loop further includes:

a first input for receiving from the counter a current cycle count for a current program clock reference;

a filter for generating a current clock frequency mismatch estimate indicative of mismatch between a program clock and the asynchronous clock, wherein the current mismatch estimate is a function of a sequence of jitter estimates for program clock references, and further wherein a given jitter estimate is the difference between a program clock reference and its corresponding dejittered program clock reference; and an output corresponding to a dejittered program clock reference for the current program clock reference computed as a sum of (i) a previous dejittered program clock reference, (ii) the current cycle count, and (iii) a product of the current cycle count and the current clock frequency mismatch estimate.

12. The apparatus of claim 11 wherein the transport stream is an MPEG-2 compliant transport stream.

13. The apparatus of claim 11 wherein the phase-locked loop further includes a filter having an input connected to receive a sequence of jitter estimates for previous program clock references, wherein a given jitter estimate is the difference between a program clock reference and its corresponding dejittered program clock reference, and an output corresponding to an estimate of clock frequency mismatch between the program clock and the asynchronous clock.

* * * * *